United States Patent [19]

Caramanian

[11] 3,900,622

[45] Aug. 19, 1975

[54] CONCRETE SURFACE TREATING MATERIAL AND METHOD OF TREATING CONCRETE SURFACES

[76] Inventor: John A. Caramanian, 1021 Summer St., Cincinnati, Ohio 45204

[22] Filed: Aug. 28, 1973

[21] Appl. No.: 392,246

Related U.S. Application Data

[63] Continuation-in-part of Ser. No. 837,989, June 3, 1969, abandoned.

[52] U.S. Cl...... 427/445; 260/31.4 EP; 260/31.4 R; 260/32.8 EP; 260/33.6 EP; 260/830 S; 428/413
[51] Int. Cl. ............................................ C08f 45/42
[58] Field of Search......... 260/33.6 EP, 830 S, 31.4, 260/31.4 EP, 32.8 EP; 117/123 D

[56] References Cited

UNITED STATES PATENTS

| | | | |
|---|---|---|---|
| 3,111,427 | 11/1963 | Wagner | 117/123 D X |
| 3,161,114 | 12/1964 | Wittenwyler | 260/830 S X |
| 3,310,601 | 3/1967 | De Acetis et al. | 260/31.4 R X |

*Primary Examiner*—Donald E. Czaja
*Assistant Examiner*—S. M. Person
*Attorney, Agent, or Firm*—James W. Pearce; Roy F. Schaeperklaus

[57] ABSTRACT

A concrete surface is treated with a low viscosity solution of an epoxy resin and an organic elastomer such as a polysulfide elastomer which penetrates deeply into the surface and fills voids therein.

4 Claims, 2 Drawing Figures

CONCRETE SURFACE TREATING MATERIAL AND METHOD OF TREATING CONCRETE SURFACES

This is a continuation-in-part of my copending application Ser. No. 837,989, filed June 3, 1969, now abandoned.

This invention relates to a method of and composition for treating and waterproofing concrete surfaces to render the surfaces wear resistant and to reduce erosion thereof.

An object of this invention is to provide a method of protecting a concrete surface to prevent erosion thereof from water penetration and subsequent freeze-thaw cycles and to increase the abrasion resistance and strength of the concrete surface.

In the usual manner of forming concrete, a thin coating of cement is caused to float to the surface. The surface cement has a relatively weak bond to coarser aggregate therebelow. A further object of this invention is to provide a coating and impregnating material which penetrates to the coarser aggregate and forms a bond therewith.

A further object of this invention is to provide such a coating composition which penetrates to a significant depth in the concrete, does not peel off, is not leached out by water thereon and resists attack by chemicals such as calcium chloride and urea and other de-icing chemicals.

A further object of this invention is to provide an epoxy resin treating composition which is of sufficiently low viscosity that it penetrates deeply into the concrete.

Figure 1:
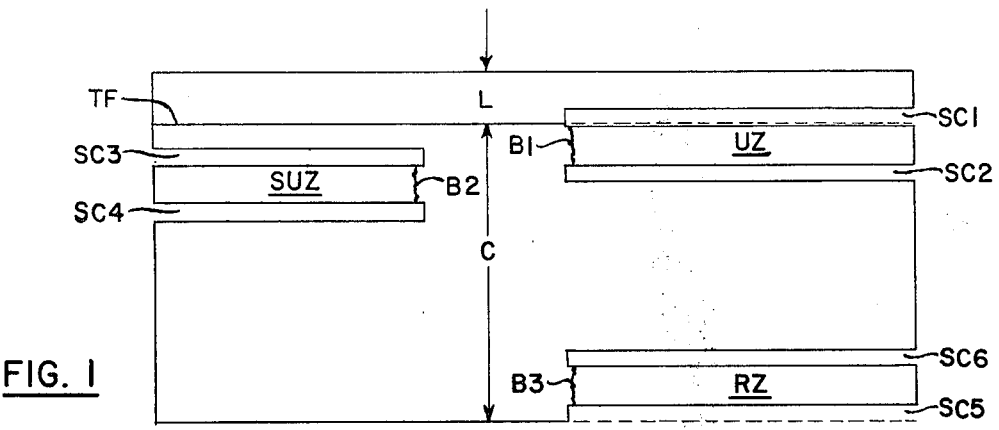
Figure 2:
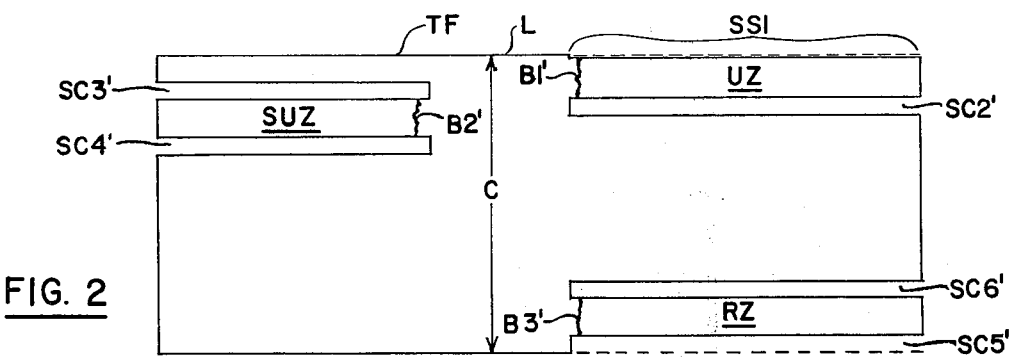

In the accompanying drawing:

FIG. 1 is a schematic view in elevation of a piece of concrete after the upper surface thereof has been treated in accordance with the prior art; and FIG. 2 is a schematic view in elevation of concrete after the upper surface thereof has been treated in accordance with the present invention.

Briefly, my treating composition includes a low viscosity solution of an epoxy resin which can include an organic elastomer such as an elastomeric polysulfide resin. The solvent can be one such as methyl isobutyl ketone which renders the solution of a low viscosity. Ethylene glycol monoethyl ether acetate (cellosolve acetate) can be added to the solution to slow the rate of evaporation of the solvent once the solution has been applied to a concrete surface. Ethylene glycol mono-butyl ether (butyl cellosolve) can also be added to pick up moisture in the concrete and to act as a wetting agent to insure a good contact between the treating solution and the concrete especially deep inside the concrete. In addition, appropriate diluents can be added to the solution such as toluol and aromatic hydrocarbon solvents.

In the following example and in the remainder hereof, all parts and percentages are given by weight.

My preferred treating solution is made from two component solutions, one of which contains the epoxy resin and the other of which contains a catalyst for causing a setting of the resin. In a preferred formulation, the component solutions can be adapted to be mixed together in equal amounts. An example of my composition includes:

COMPONENT A:

| | |
|---|---|
| 26.00 parts | glycidel-ether modified 100% solids epoxy resin (Shell Epon 815) |
| 8.64 parts | methyl isobutyl ketone |
| 8.64 parts | ethylene glycol monoethyl ether acetate |
| 24.34 parts | ethylene glycol mono-butyl ether |
| 23.74 parts | aromatic hydrocarbon solvent (Hisol 10F) |
| 8.64 parts | toluol |
| 100.00 parts | |

COMPONENT B:

| | |
|---|---|
| 6.43 parts | polysulfide elastomer (Thiokol polysulfide LP 3) |
| 3.21 parts | diethylene triamine |
| 10.04 parts | methyl isobutyl ketone |
| 10.04 parts | ethylene glycol monoethyl ether acetate |
| 10.04 parts | toluol |
| 35.81 parts | ethylene glycol mono-butyl ether |
| 24.43 parts | aromatic hydrocarbon solvent (Hisol 10F) |
| 100.00 parts | |

The resin of Component A can be the commercial product known as Shell Epon 815, a trademark of Shell Oil Company. This resin has a viscosity of about 5 to 7 poises at 25°C. and is approximately 100% solids. The aromatic hydrocarbon solvent can be the commercial product known as Hisol 10F, a trademark of Ashland Oil & Refining Company, which has a boiling point range from 320°F. to 350°F. The polysulfide elastomer can be the commercial product known as Thiokol polysulfide LP 3, a trademark of Thiokol Chemical Corporation.

Components A and B can be prepared and stored until ready for use. When ready for use, equal weights or volumes of Components A and B are mixed together to form a mixed treating composition having a viscosity of approximately 12 seconds as measured in a Number 4 Ford cup. The mixed treating composition consists of:

| | |
|---|---|
| 26.00 parts | glycidel-ether modified epoxy resin (Shell Epon 815) |
| 6.43 parts | polysulfide elastomer (Thiokol polysulfide LP 3) |
| 3.21 parts | diethylene triamine |
| 18.68 parts | methyl isobutyl ketone |
| 18.68 parts | ethylene glycol monoethyl ether acetate |
| 60.15 parts | ethylene glycol mono-butyl ether |
| 18.68 parts | toluol |
| 48.17 parts | aromatic hydrocarbon solvent (Hisol 10F) |
| 200.00 parts | |

The mixed treating composition is spread on the concrete surface with a brush or roller or can be sprayed on the concrete preferably at a rate of approximately 1 gallon to 100 to 150 square feet of concrete surface.

The resin penetrates to a substantial depth into the concrete, the depth of penetration varying with the consistency of the concrete, the penetration being about one-fourth to three-eighths inches in highway concrete.

The resin sets sufficiently for use in about an hour if the temperature of the concrete is approximately 72°F. and sets hard in about 48 hours at that temperature. The resin fills the voids in the surface layer of the concrete protecting the concrete against entry of water. The presence of the elastomer makes it possible for the set resin to stretch within the cavities of the concrete filling voids and without separating from the walls of the cavities.

The viscosity of the mixed treating composition is preferably about 12 seconds as measured with a Number 4 Ford cup as indicated above. However, the viscosity can vary from about 9 seconds to about 25 seconds, a range of 10 to 17 seconds being preferred and suitable for use with usual concrete formulations. The viscosity may require variation with variation of the characteristics of the concrete. The viscosity can be varied by varying the proportion of the solvent and of the toluol. The viscosity is preferably selected to permit a penetration of the mixed treating composition into the concrete to a depth of one-fourth to three-eight inches.

In the example, a glycidel-ether modified epoxy resin is used, but other epoxy resins can be used.

In the example, a polysulfide elastomer is used, but other organic elastomers which are compatible with the epoxy resin and solvent and are not water soluble can be used instead of the polysulfide resin, such as polyurethane resins, vinyl resins, polyester resins, and natural and synthetic rubbers.

Excellent results are had where the treating composition includes approximately 26 parts of an epoxy resin, 3 parts of a catalyst therefor, the amount of the catalyst being sufficient to cause setting of the resin, 6.5 parts of an organic elastomer such as a polysulfide elastomer, 19 parts of methyl isobutyl ketone, 19 parts of ethylene glycol monoethyl ether acetate, 60 parts ethylene glycol mono-butyl ether and 67 parts of diluent, the diluent being toluol and the aromatic hydrocarbon solvent. The properties of the various constituents can be varied and with 20 to 30 parts of epoxy resin, I can mix approximately 6 to 7 parts of organic elastomer, 15 to 21 parts of methyl isobutyl ketone, 15 to 21 parts of ethylene glycol monoethyl ether acetate, 50 to 70 parts ethylene glycol mono-butyl ether, and 50 to 70 parts of diluent.

The prior art discloses use of a variety of coatings on concrete roadways and U.S. Pat. No. 3,161,114 to Wittenwyler discloses use of epoxy adhesives for bonding particles to the wear bearing surface to impart improved wear resistance and skid resistant properties. However, such building up of a layer of wear and skid resistant material on top of the surface of a concrete roadway is very different from the herein disclosed opposite, of treatment of the portions of a concrete roadway extending downward below the top surface thereof. In Wittenwyler type practice there is no substantial penetration of epoxy material into the concrete, while practice of the present invention results in substantial amounts of epoxy material penetrating to substantial depth in the concrete. To ascertain comparative data regarding the quantity and depth of penetration, using commercially available resin which is substantially the same as that described by Wittenwyler, the following experiments were performed; the first four were respectively in accordance with Wittenwyler Examples I, V, IV, and VIII while the fifth embodies the present invention using similar materials. In the following experiments, all parts and percentages are taken by weight.

SAMPLE I (according to Wittenwyler Example I)

100 parts of Shell Chemical Company Epon Resin 826 (a commercial epoxy type resin having a viscosity of 65 to 95 poises at 25°C. and an epoxide equivalent of 180 to 188) and 50 parts of pine oil distillate boiling at 204° to 219°C. were mixed together. 15 parts of diethylene triamine were then added to form Coating Composition Number 1.

80 parts of Coating Composition Number 1 and 80 parts of crushed quartz were mixed together to form Coating Mixture Number 1.

SAMPLE II (according to Wittenwyler Example V)

100 parts of Shell Epon Resin 826, 50 parts of Thiokol resin No. LP-32 (a commercial liquid polysulfide polymer having a molecular weight of about 4000 and including reactive thiol groups) were combined together. 10 parts of diethylene triamine were added and 80 parts of the resulting mixture were combined with 80 parts of crushed quartz to form Coating Mixture Number 2.

SAMPLE III (according to Wittenwyler Example IV)

100 parts of Epon 826 and 70 parts of melted Duomeen S were combined together. 80 parts of the resulting mixture were combined with 80 parts crushed quartz to form Coating Mixture Number 3.

SAMPLE IV (according to Wittenwyler Example VIII)

100 parts of Epon 826 and 50 parts of Shell V-25 (a commercial condensation product of a polyamine and polymerized unsaturated fatty acids having a viscosity of approximately 100 poises at 40°C.) were combined together. 80 parts of the resulting mixture were combined with 80 parts of crushed quartz to form Coating Mixture Number 4.

SAMPLE V (an embodiment of the instant invention)

A mixed treating composition was prepared by mixing equal parts of components A and B of this application. This composition is identified as Sample 5.

A cylindrical sample of bridge concrete was sawed into a group of discs.

Coating Mixture Number 1 was spread on one of the cut faces of one of the discs at a rate of about 2 pounds per square yard, and additional crushed quartz was pressed on top. Coating Mixture Number 1 was permitted to set up, dry, and harden at room temperature for approximately 24 hours. This disc is identified as disc No. 1.

Coating Mixture 2 was spread on one of the cut faces of another of the discs at a rate of about 2 pounds per square yard, and additional crushed quartz was pressed on top. Coating Mixture Number 2 was permitted to set up, dry and harden at room temperature for approximately 24 hours. This disc is identified as disc No. 2.

Coating Mixture Number 3 was spread on one of the cut faces of another of the discs at a rate of about 2 pounds per square yard, and additional crushed quartz was pressed on top. Coating Mixture Number 3 was permitted to set up, dry and harden at room temperature for approximately 24 hours. This disc is identified as disc No. 3.

Coating Mixture Number 4 was spread on one of the cut faces of another of the discs at a rate of about 2 pounds per square yard, and additional crushed quartz was pressed on top. Coating Mixture Number 4 was permitted to set up and dry and harden at room temperature for approximately 24 hours. This disc is identified as disc No. 4.

Sample 5 was spread on one of the cut faces of another of the discs. Sample 5 was permitted to set up, dry and harden at room temperature for approximately 24 hours. This disc is identified as disc No. 5.

The concrete discs 1 through 5 of Samples 1 through 5 inclusive were then subjected to analytic determination of the distribution of carbon in the concrete portions of each disc attributable to penetration of the disc by carbon compounds such as are present in the SAMPLE I, II, III, IV, and V materials when cured, which are neither attacked by nor dissolved by hydrochloric acid.

Each of the discs numbered 1, 2, 3, and 4 included a layer of non-concrete material on the treated face. Each of said four discs was analyzed in the following manner.

A sector portion of the disc was separated from the balance thereof by breaking or sawing along a chord, and FIG. 1 is a schematic view in section through the sector portion in which the layer of non-concrete material is designated by the reference character L and the concrete portion of which sector portion is designated by the reference character C. A saw cut SC1 was made along the plane of the treated surface to detach the layer of non-concrete material on the treated face from the underlying portion of the disc. A second saw cut SC2 was made parallel to SC1 so as to leave a one-eighth inch thick upper zone slab UZ between the two cuts SC1 and SC2. The upper zone slab UZ was broken loose from the balance of the disc sector, as along the line B1.

From the opposite side of the sector portion of the disc a saw cut SC3 was made parallel to the treated face TF thereof so that the lower side of the saw cut was substantially coplanar with the upper side of saw cut SC2. A fourth saw cut SC4 was then made parallel to saw cut SC3 so as to leave a one-eighth inch thick sub-upper zone slab SUZ between saw cuts SC3 and SC4. Slab SUZ was then broken loose from the balance of the disc sector, as along the line B2.

The bottom surface of the sector of the disc was cleaned by making saw cut SC5. An additional saw cut SC6 was made parallel to saw cut SC5 and spaced therefrom so as to leave a one-eighth inch thick remote zone slab RZ between them. The slab RZ was then broken free from the balance of the sector of the disc, as along the line B3.

The slab UZ was examined and a portion thereof free of large stones was selected, that is, a portion composed of small sand-like particles bound by Portland cement. Holes were bored through the one-eighth inch thickness of the selected portion and the borings were collected. The collected borings were ground in an agate mortar and reduced to a fine powder. One gram of the fine powder was then treated with an excess of dilute hydrochloric acid (1 part by volume of concentrated hydrochloric acid to 3 parts by volume of distilled water) to by dissolution and chemical action remove carbon not combined in a compound which is not attacked by or removed by the dilute acid solution. Material not dissolved by the dilute hydrochloric acid solution was collected on an asbestos filter and analyzed for carbon by the technique of ASTM E 350, using a Leco Induction furnace for combustion and a Leco Volumetric Carbon determinator for quantitative measurement of evolved carbon dioxide.

Slab SUZ was analyzed in the same above described manner as Slab UZ. Slab RZ was analyzed in the same above described manner as slabs UZ and SUZ.

Each of the samples of the slabs UZ, SUZ, and RZ of each disc was analyzed in like fashion, and the results of these analyses are respectively set forth in the Columns "Disc No. 1," "Disc No. 2," "Disc No. 3" and "Disc No. 4" of the following table, the values given in the table being percentages by weight of carbon in each representative sample. Disc No. 5 was analyzed in the following manner. Disc No. 5 had no appreciable layer of non-concrete material on its treated face TF, but the treated face thereof had a slightly darkened appearance. A sector portion of the disc was separated from the balance thereof by breaking along a chord, and FIG. 2 is a schematic view in section through the sector portion in which the layer of non-concrete material is designated by the reference character L and the concrete portion of which sector portion is designated by the reference character C. The treated face TF of Disc No. 5 was sanded to remove such small amount of treating material as might be thereon and produced sanded surface SS1 parallel to and substantially coplanar with the surface treated. A saw cut SC2' was made parallel to SS1 so as to leave a one-eighth inch thick upper zone slab UZ between SS1 and cut SC2'. The upper zone slab UZ was broken loose from the balance of the disc sector, as along the line B1'.

From the opposite side of the sector portion of the disc a saw cut SC3' was made parallel to the treated face TF thereof so that the lower side of the saw cut was substantially coplanar with the upper side of saw cut SC2'. A saw cut SC4' was then made parallel to saw cut SC3' so as to leave a one-eighth inch thick sub-upper zone slab SUZ between saw cuts SC3' and SC4'; and slab SUZ was then broken loose from the balance of the disc sector, as along the line B2'.

The bottom surface of the sector of the disc was cleaned by making saw cut SC5'. An additional saw cut SC6' was made parallel to saw cut SC5' and spaced therefrom so as to leave a one-eighth inch thick remote zone slab RZ between them. The slab RZ was then broken free from the balance of the sector of the disc, as along the line B3'.

The slabs UZ, SUZ and RZ of Disc No. 5 were each analyzed in the same above described manner as slab UZ of Discs 1, 2, 3 and 4.

Each of the samples of the slabs UZ, SUZ, and RZ of Disc No. 5 was thus analyzed in like fashion as those of the other discs, and the results of those analyses are respectively set forth in the Column "Disc No. 5" of the following table, the values given in the table being percentages of carbon by weight in each representative sample.

|  | Disc No. 1 | Disc No. 2 | Disc No. 3 | Disc No. 4 | Disc No. 5 |
|---|---|---|---|---|---|
| Sample UZ | .93 | .159 | .286 | .091 | 1.229 |
| Sample SUZ | .113 | .068 | .063 | .073 | .320 |
| Sample RZ | .068 | .068 | .091 | .068 | .111 |

The analytical tests demonstrate that there was substantially greater penetration of carbon containing material into the UZ and SUZ zones from the treated surface to a depth of one-fourth inch from the treated face of disc No. 5 but that there was no such substantial penetration of carbon containing material in the other discs prepared in accordance with the prior art, Wittenwyler.

Thus, the prior art, represented by Wittenwyler, teaches building up of a substantial layer above the surface of the roadway with no substantial penetration at depth, the opposite of the instant invention which produces negligible build-up on the surface (discoloration of the surface) and penetration of substantial quantity through a zone of substantial depth.

Having described my invention, what I claim as new and desire to secure by letters patent is:

1. A composition for treating a concrete surface which consists essentially of approximately 26 parts of an epoxy resin, 6.5 parts of an organic elastomeric polysulfide resin which is compatible with the epoxy resin, 19 parts methyl isobutyl ketone, 19 parts ethylene glycol monoethyl ether acetate, 60 parts ethylene glycol monobutyl ether, and 67 parts diluent, all parts being by weight, the composition having a viscosity of 9 to 25 seconds measured with a Number 4 Ford cup.

2. A method of treating a concrete surface which comprises applying to the surface a solution consisting essentially of 20 to 30 parts of an epoxy resin 6 to 7 parts of an organic elastomeric polysulfide resin which is compatible with the epoxy resin, 15 to 21 parts of methyl isobutyl ketone, 15 to 21 parts of ethylene glycol monoethyl ether acetate, 50 to 70 parts ethylene glycol mono-butyl ether, and 50 to 70 parts diluent, all parts being by weight, the solution having a viscosity of 9 to 25 seconds measured with a Number 4 Ford cup at a rate of approximately 1 gallon to 100 to 150 square feet of concrete surface.

3. A composition for treating a concrete surface which consists essentially of 20 to 30 parts of an epoxy resin, six to seven parts of a polysulfide elastomeric resin which is compatible with the epoxy resin, 15 to 21 parts of methyl isobutyl ketone, 15 to 21 parts of ethylene glycol monoethyl ether acetate, 50 to 70 parts ethylene glycol mono-butyl ether, and 50 to 70 parts of diluent, all parts being by weight, the composition having a viscosity of 9 to 25 seconds measured with a Number 4 Ford cup.

4. A method of treating a concrete surface which comprises applying to the surface a solution consisting essentially of approximately 26 parts of an epoxy resin, 6.5 parts of an organic elastomeric polysulfide resin which is compatible with the epoxy resin, 19 parts methyl isobutyl ketone, 19 parts ethylene glycol monoethyl ether acetate, 60 parts ethylene glycol monobutyl ether, and 67 parts diluent, all parts being by weight, the solution having a viscosity of 9 to 25 seconds measured with a Number 4 Ford cup at a rate of approximately one gallon to 100 to 150 square feet of concrete surface.

* * * * *